Feb. 7, 1933.  A. GÜNZEL  1,896,138
VEHICLE WHEEL
Filed March 26, 1930
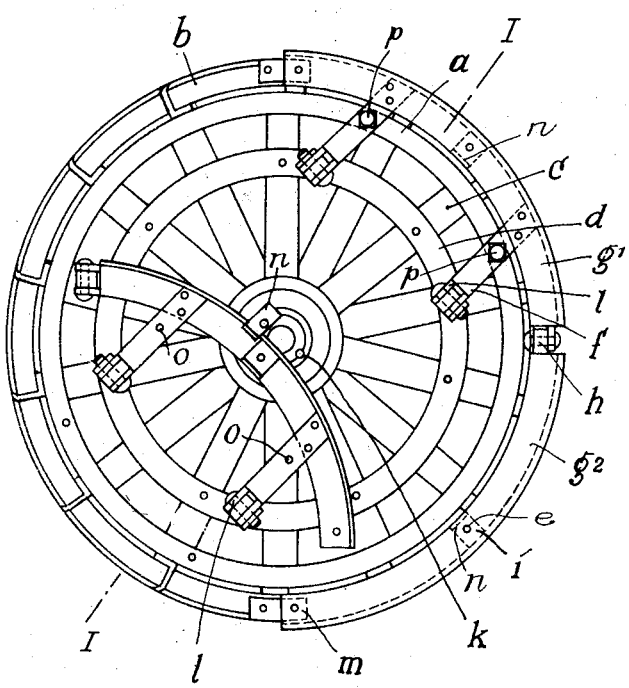
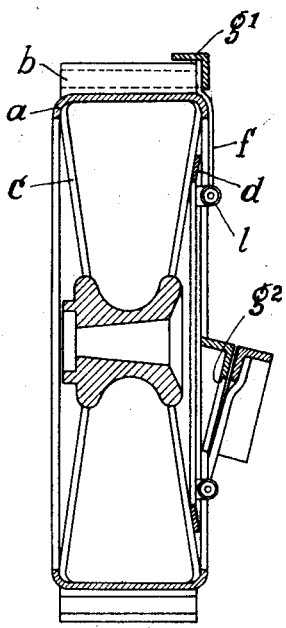

Patented Feb. 7, 1933

1,896,138

UNITED STATES PATENT OFFICE

ARNO GÜNZEL, OF ALTENBURG, GERMANY

VEHICLE WHEEL

Application filed March 26, 1930, Serial No. 439,166, and in Germany April 2, 1929.

My invention relates to improvements in vehicle wheels, and more particularly in vehicle wheels for agricultural vehicles or tractors, in which the rim of the wheel is provided circumferentially with gripping members for improving the adhesion of the wheel on the ground. The object of the improvements is to provide a wheel of this class in which a subsidiary rim is provided which is adapted to be placed around the gripping members when driving on roads. With this object in view my invention consists in mounting sectional subsidiary rims in the form of segments on the side of the wheel, which segments are supported by means of hinges permitting the same to be rocked through an angle of about 180°.

For the purpose of explaining the invention an example embodying the same has been shown in the accompanying drawing, in which the same letters of reference have been used in all the views to indicate corresponding parts. In said drawing Fig. 1 is an elevation showing the wheel, and Fig. 2 is a sectional elevation taken on the line 1—1 of Fig. 1.

In the example shown in the drawing the wheel comprises a fixed rim $a$ having gripping members or ribs $b$ fixed thereto, the said wheel being designed for use on tractors, motor plows and the like. On the wheel a subsidiary rim is mounted which is adapted to be placed into position for circumferentially covering the gripping members, and as shown the said subsidiary rim consists of four segmental rim sections $g^1$ and $g^2$ having angular cross-section and adapted to cover the gripping members $b$ at one of their edges, thus providing a smooth rim for the vehicle driving on roads. Preferably the circumferential length of the said segmental rim sections is such that the rim sections are nearly in contact with one another at their ends, so that there are no objectionable spaces between the rim sections.

Each of the diametrically opposite segmental rim sections $g^1$ is fixed to a pair of arms $f$ which are rockingly mounted with their inner ends on bolts $l$ secured to a ring $d$ fixed to the end face of the wheel. Thus each segment is adapted to be rocked from the position shown at the upper right hand part of Fig. 1 into the position shown at the left hand bottom part of the said figure by merely rocking the same outwardly or inwardly, the right hand upper part of Fig. 1 showing the sectional rim in the position for covering the gripping members, and the left hand bottom part of Fig. 1 showing the sectional rims in inoperative position.

The diametrically opposite rim sections $g^2$ are each connected by a hinge $h$ having a substantially radial pintle, with a segmental section $g^1$, so that each rim section $g^2$ may be rocked from the position shown at the right of Fig. 1 first on the rim section $g^1$ connected therewith by rocking the same through an angle of 180°, whereupon it may be rocked inwardly together with the rim section $g^1$ into the position shown at the left in Fig. 1.

The supplemental rim sections $g^2$ are, as heretofore stated, capable of being swung about the bolts or pintles $l$ on the wheel. Each of these sections is provided with one or more angle plates $i$, one flange of which is secured to the section as by means of the rivet or other fastening element $e$. The other flange $n$ of the angle plate is adapted to bear against the outer periphery of the main rim or felloe of the wheel. By this means the load on the supplemental rim is transmitted to the main rim instead of being borne by the hinge pintles $l$. Also, in operative position, the individual supplemental tread rim sections are connected at their adjacent ends by means of the plates $m$ in such a manner as to form a strong and rigid support for the vehicle.

As shown in Figure 1 of the drawing, apertures $k$ for the reception of bolts are formed in the wheel hub, by means of which lugs $n$ overlying the rim sections may be secured in position for the purpose of retaining these rim sections in inoperative or folded relationship to the wheel body. Cooperating apertures $o$ are also provided in the arms $f$ and the main wheel rim $a$ through which bolts $p$ may be passed to secure the rim sections $g'$ in operative position.

It will be understood that the gripping members may be provided either on the main rim or on the auxiliary sectional rim, the latter rim being more suitable when the vehicle is intended primarily for use on smooth surfaces and is only occasionally required for use on irregular ground or in mud or snow.

In describing the invention reference has been made to the specific embodiment shown in the drawing which is illustrated herein in detail in order to facilitate an understanding of the invention. It will nevertheless be appreciated that various alterations and changes may be made in this construction without departing from the spirit and scope of the invention as defined in the appended claims.

I claim:

1. A vehicle wheel, comprising a main rim, and a subsidiary rim made in sections, means for mounting some of said rim sections on said vehicle wheel for rocking movement into and out of operative position for covering the main rim, means for connecting the other rim sections with the said rockingly mounted sections for movement with respect thereto into and out of operative position for covering the main rim, and means for retaining said rim sections in operative position.

2. A vehicle wheel comprising a main rim and a subsidiary rim made in sections, means for mounting some of said rim sections on said vehicle wheel for rocking movement into and out of operative position in which portions thereof extend beyond the periphery of the main rim, means for pivotally connecting the other rim sections with said rockingly mounted sections for movement into and out of operative position beyond the periphery of the main rim, and means for retaining said rim sections in operative position.

In testimony whereof I hereunto affix my signature.

ARNO GÜNZEL.